United States Patent [19]
Hansen

[11] Patent Number: 5,960,830
[45] Date of Patent: Oct. 5, 1999

[54] FAUCET ASSEMBLY

[75] Inventor: Stanley L. Hansen, Arvada, Colo.

[73] Assignee: Lectra Products Company, Arvada, Colo.

[21] Appl. No.: 09/080,844

[22] Filed: May 18, 1998

[51] Int. Cl.$^6$ ................................................. F16K 31/60
[52] U.S. Cl. ...................... 137/625.4; 16/121; 16/114 R; 137/625.41; 403/366; 403/372
[58] Field of Search ............................ 137/625.4, 625.41, 137/625.17, 606; 251/291; 16/114 R, 110 R, 121, 122, DIG. 24, DIG. 36; 403/366, 372

[56] References Cited

U.S. PATENT DOCUMENTS

| | | | |
|---|---|---|---|
| Re. 24,046 | 7/1955 | Nathan | 116/133 |
| Re. 26,769 | 1/1970 | Van Buren, Jr. | 287/53 |
| 1,225,420 | 5/1917 | Eggert | 16/DIG. 24 X |
| 1,448,019 | 3/1923 | Wilson . | |
| 2,507,392 | 5/1950 | Williams | 40/8 |
| 2,643,903 | 6/1953 | Nathan | 287/53 |
| 2,688,261 | 9/1954 | Hansen | 74/545 |
| 2,718,417 | 9/1955 | Hansen | 287/53 |
| 2,968,504 | 1/1961 | Hansen | 287/53 |
| 3,329,452 | 7/1967 | Ammon | 276/53 |
| 3,336,059 | 8/1967 | Leitman | 287/53 |
| 3,498,650 | 3/1970 | Strange | 287/53 |
| 3,558,165 | 1/1971 | Lundergan | 287/53 |
| 3,580,619 | 5/1971 | Maltais | 287/53 |
| 3,635,512 | 1/1972 | Hansen | 292/353 |
| 3,730,571 | 5/1973 | Van Buren, Jr. | 287/53 |
| 3,751,612 | 8/1973 | Hansen | 200/52 R |
| 3,994,608 | 11/1976 | Swiderski et al. | 403/372 |
| 4,113,399 | 9/1978 | Hansen, Sr. | 403/329 |
| 4,189,248 | 2/1980 | Sully | 16/118 X |
| 4,784,180 | 11/1988 | Sieberhagen | 137/625.4 X |
| 5,337,450 | 8/1994 | Martin | 16/114 R |
| 5,364,065 | 11/1994 | Tauati | 137/606 X |
| 5,537,893 | 7/1996 | Snider | 74/553 |
| 5,551,124 | 9/1996 | Zeringue | 16/121 |
| 5,623,854 | 4/1997 | Snider | 74/553 |
| 5,671,904 | 9/1997 | Minutillo | 16/121 X |

Primary Examiner—John Rivell
Assistant Examiner—Meredith H. Schoenfeld
Attorney, Agent, or Firm—Fields and Johnson, P.C.

[57] ABSTRACT

An improved faucet assembly is provided which includes a standard valve assembly used in basic plumbing systems, and a spout which communicates with the valve assembly to deliver water to a desired area. The valve assembly includes a valve stem which serves as the means by which the flow of water through the valve assembly is controlled. A simplified knob or handle attaches to the valve stem by means of a spring member which minimizes rotational and longitudinal movement of the knob or handle with respect to the valve stem. The spring member may either be a D-shaped spring, or a flat spring, depending upon the specific type of movement which must be restricted with respect to movement between the knob or handle and the valve stem. The use of the spring member and the simplified knob or handle results in a compression or friction type attachment.

4 Claims, 4 Drawing Sheets

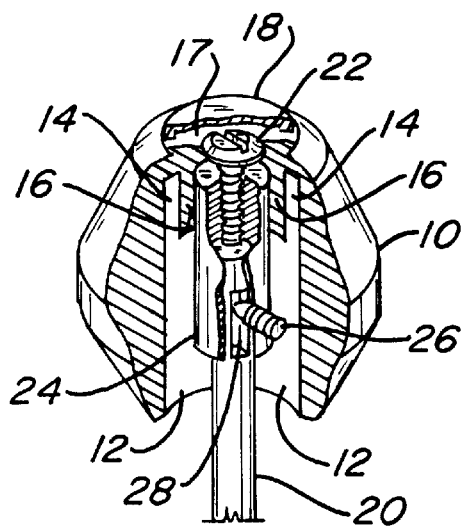
Fig_1
PRIOR ART
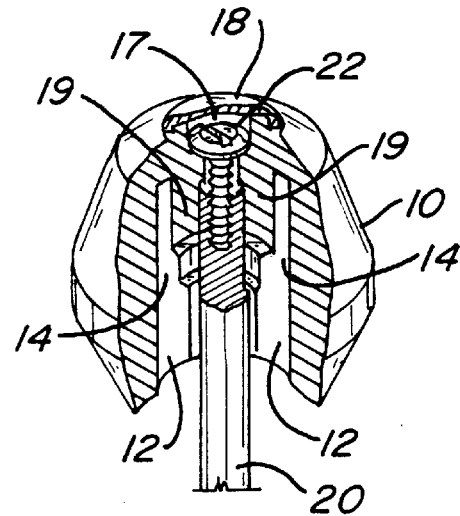
Fig_2
PRIOR ART
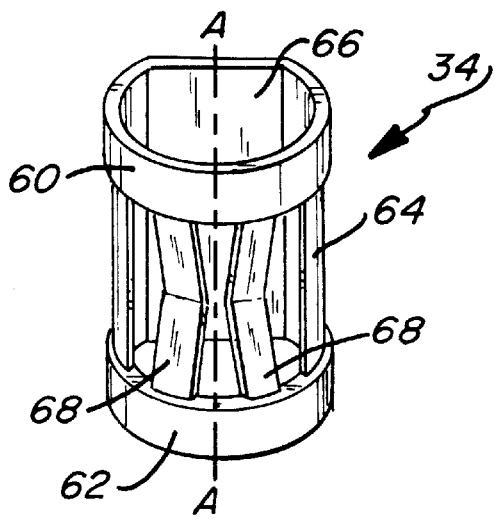
Fig_6
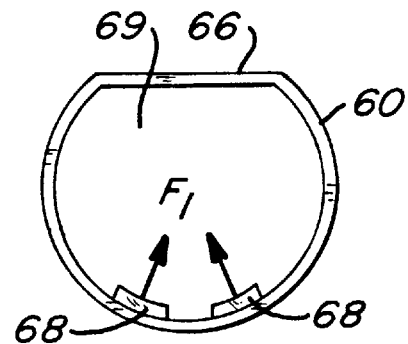
Fig_7

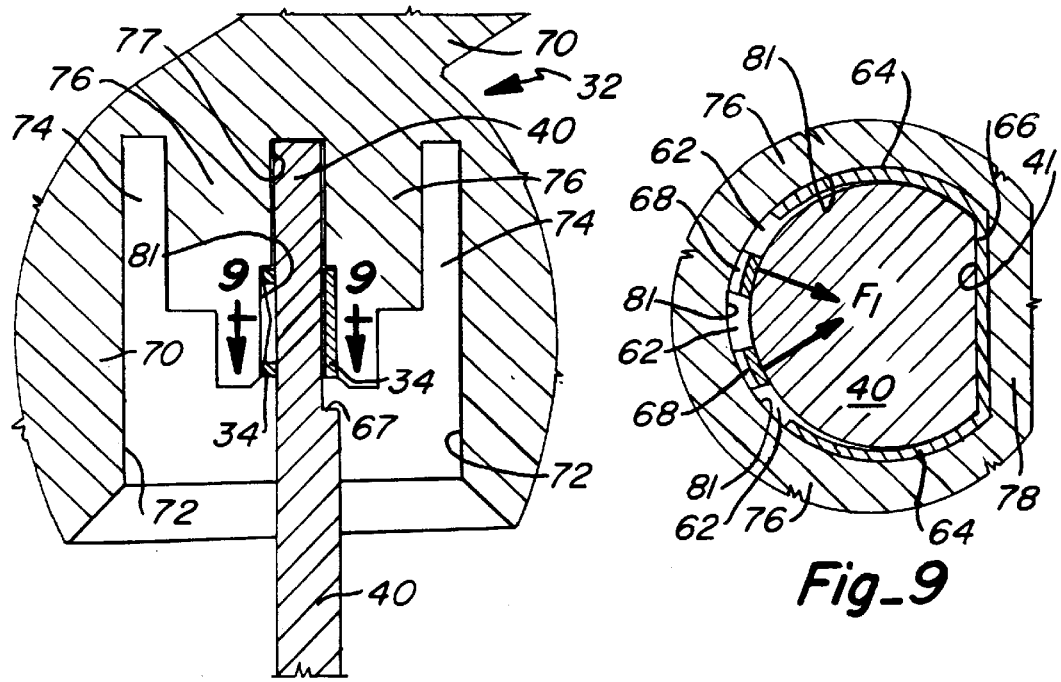
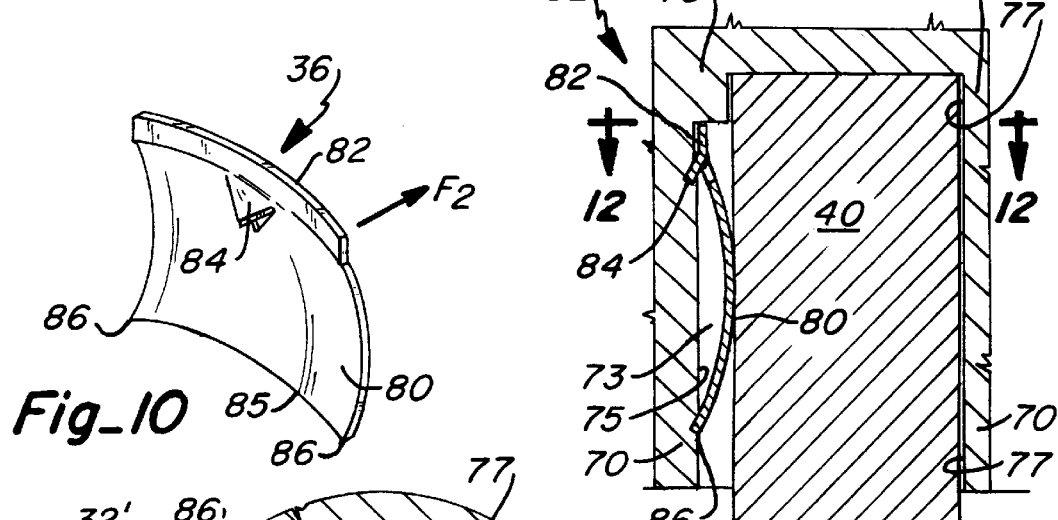
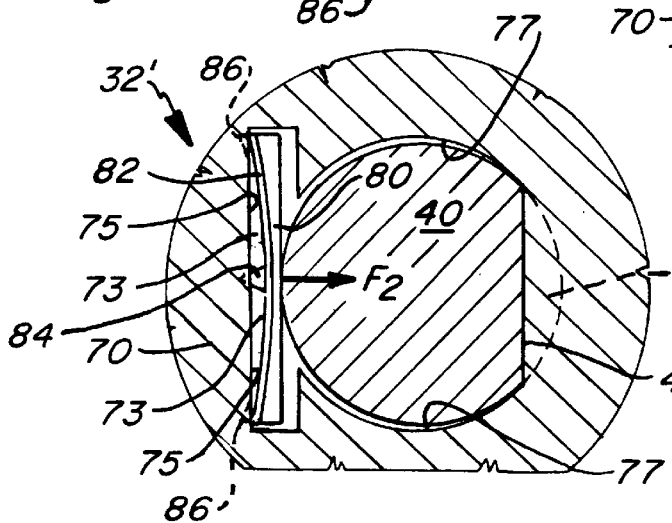

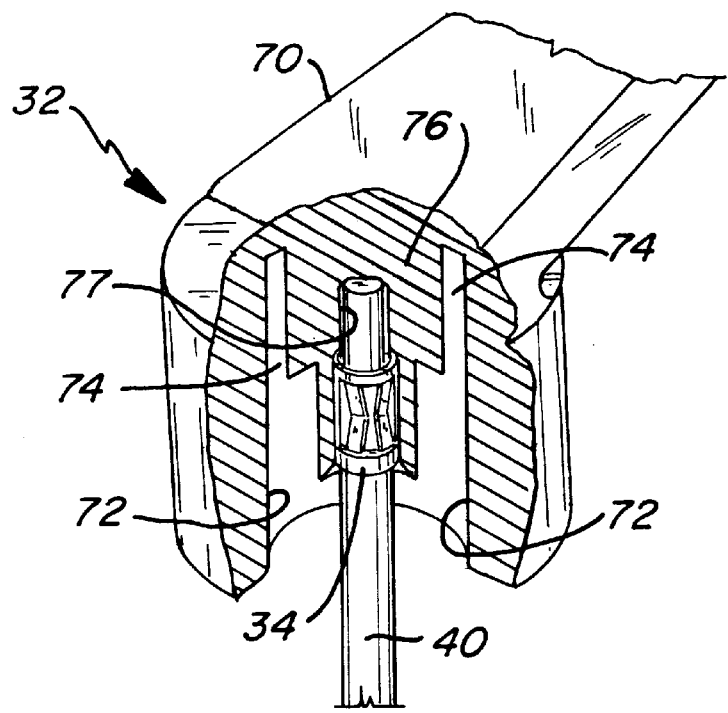
Fig_13
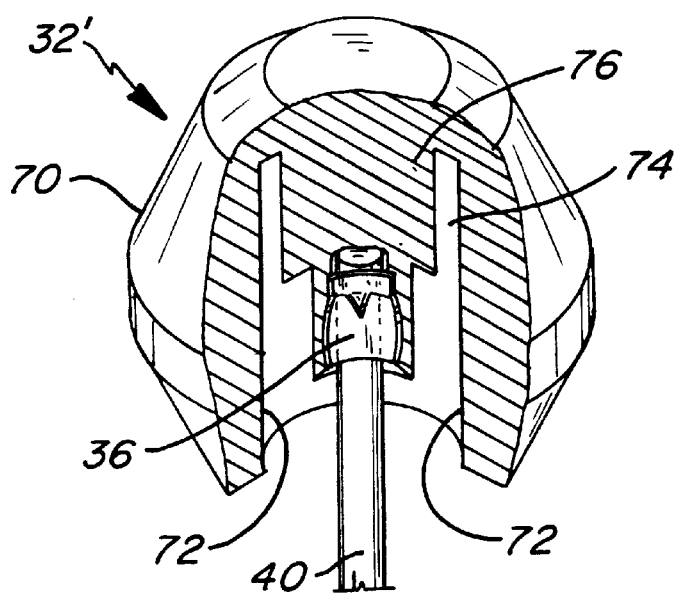
Fig_14

FAUCET ASSEMBLY

TECHNICAL FIELD

This invention relates to an improvement in a faucet assembly and, more particularly, to a simplified faucet knob or handle which makes use of a spring member as the means to connect the faucet handle to a valve stem of a valve assembly within the faucet assembly.

BACKGROUND ART

Over the years, basic plumbing systems used for delivering potable water have evolved so that the plumbing systems can be more easily repaired with less manpower and at reduced costs. Not only have materials improved, but also the components making up plumbing systems have advanced so that plumbing systems are also more reliable. Although basic plumbing systems in the home or business can be fairly characterized as simple mechanical systems, there is still much room for improvement in further reducing the costs of such systems as well as simplifying their construction.

One aspect of common plumbing systems which has not changed over the years is the means by which faucet knobs or handles are attached to the valve stems of valve assemblies which control the flow of water. The great majority of all faucet handles are attached to their valve stems by means of a threaded screw which mates with a tapped portion of the valve stem shaft or a tapped insert connected to the valve stem shaft. To conceal the threaded screw for decorative purposes, most such handles must be specially constructed to include a recessed portion which receives an index cap or cover to conceal the threaded screw. The special construction of the handle requiring an index cap along with the use of a threaded screw and a threaded valve stem shaft/insert all add to the cost of a faucet assembly. Furthermore, since the connection between the index cap and the handle is not watertight, moisture can be introduced into the recess and to the threaded screw causing corrosion. The corrosion can make it difficult to remove the set screw, and the index cap can become lost, broken, or lose its capability to properly attach to the handle. The connection can also be the means by which bacteria and other undesirable microorganisms can grow because of the trapped moisture, thus making the handle a possible source of contamination after one has washed his/her hands.

Each of the foregoing disadvantages can be overcome by the use of a knob or handle which may simply friction-fit over a valve stem shaft. In other words, the use of a compression-type fitting for connecting the handle to the valve stem shaft eliminates the need for a threaded screw, an index cap, and a recess in the knob or handle to receive the index cap.

SUMMARY OF THE INVENTION

In accordance with the present invention, an improved faucet assembly is provided. The faucet assembly includes a standard valve assembly used in the basic plumbing systems of homes or businesses. Examples of standard valve assemblies include compression types, cartridge types, and ball types. Common to all types of valve assemblies is the use of a valve stem which serves as the means by which the faucet knob or handle attaches to the valve assembly. Also common to basic plumbing systems incorporated in this invention is the use of a spout which communicates with the valve assembly to deliver the water to a desired area, for example, to a sink or basin. The faucet assembly of this invention further includes the use of a simplified knob or handle which is grasped by the user to manipulate the flow of water through the valve assembly. The handle has a cavity which receives the valve stem shaft, and a spring member which is placed over or adjacent to the valve stem shaft and between an internal mounting portion within the cavity to create a compression or friction type attachment means. A D-shaped spring member is utilized for those faucet assemblies which have a handle member which controls the flow of water without the need for substantial torque on the handle, or which has a torque-bearing handle cavity extending beyond the D-shaped spring. A flat spring member is most often used for those faucet assemblies which have a handle member which controls the flow of water by rotational movement of the valve stem shaft, which requires the application of greater torque to the handle.

Because the handle is attached to the valve stem shaft by a compression or friction type attachment, the handle itself is greatly simplified since it does not require a recess and an index cap. Furthermore, because a friction or compression type attachment is used, the valve stem shaft does not need to be threaded and no threaded screw or insert is required. Because an index cap and recess are not required, the handle is more easily cleaned and becomes less of a hazard in terms of being a source of contamination. Because of the ease of assembly and disassembly, the faucet assembly can be shipped with the handle disassembled. This reduces the size of the required packaging by ten to twenty percent, resulting in reduced shipping charges.

Additional advantages of this invention will become apparent from the description which follows, taken in conjunction with the accompanying drawings.

BRIEF DESCRIPTION OF THE DRAWINGS

FIG. 1 is a cutaway perspective view of a prior art device illustrating a handle attached to a valve stem shaft;

FIG. 2 is another cutaway perspective view of another type of prior art device illustrating a handle attached to a valve stem shaft;

FIG. 6 is a greatly enlarged perspective view of a D-spring;

FIG. 7 is a plan view of the D-spring of FIG. 6;

FIG. 8 is a greatly enlarged fragmentary vertical section taken along line 8—8 of the faucet handle illustrated in both FIG. 3 or 4, with some parts omitted for clarity of illustration;

FIG. 9 is a greatly enlarged horizontal section taken along line 9—9 of FIG. 8;

FIG. 10 is a greatly enlarged perspective view of a flat spring;

FIG. 11 is a greatly enlarged fragmentary vertical section, taken along line 11—11 of FIG. 5, with some parts omitted for clarity of illustration;

FIG. 12 is a horizontal section, taken along line 12—12 of FIG. 11;

FIG. 13 is an enlarged cutaway perspective view of the faucet handle of both FIG. 3 or 4 mounted to their corresponding valve stem shafts and which utilize the D-spring, certain parts being omitted for clarity of illustration; and FIG. 14 is an enlarged cutaway perspective view of the faucet handle of FIG. 5 illustrating the handle mounted to its valve stem shaft and incorporating the use of the flat spring, certain parts being omitted for clarity of illustration.

BEST MODE FOR CARRYING OUT THE INVENTION

Figure 5:
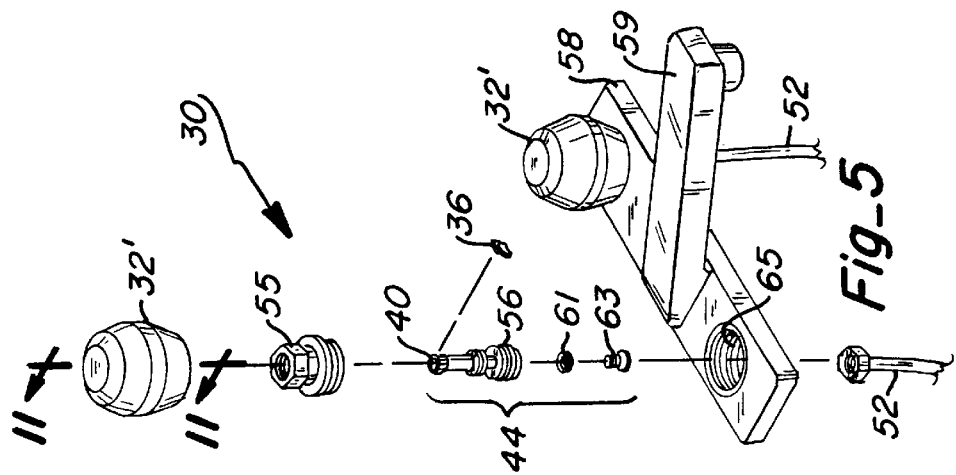
FIG. 5 is another exploded perspective view of the faucet assembly of this invention especially adapted for use with a compression-type valve assembly.

As shown in FIG. 1, a prior art faucet handle 10 is illustrated. This particular handle 10 includes a cavity 12 which receives the various structural elements for securing the handle 10 to the valve stem shaft 20. More particularly, the handle 10 includes an internal mounting portion 16 which extends into cavity 12 and defines annular extension 14 which communicates with cavity 12. Internal mounting portion 16 has an opening or hole drilled therethrough for receiving brass insert 24. A recess 17 is formed in the upper portion of the handle 10 for receiving handle screw 22. In order to hide the handle screw 22 from view, an index cap 18 is placed over the recess 17. The upper end of the brass insert 24 is drilled and tapped to receive handle screw 22. The lower end of the brass insert 24 is placed over and secured to the upper end of the valve stem shaft 20. In order to prevent undesirable rotational movement, the brass insert 24 may further include a set screw 26 which is placed through a side opening in the brass insert, with the tip of the set screw 26 being received in a groove or slot 28 formed on the valve stem shaft 20.

The prior art device of FIG. 2 is similar to the prior art device of FIG. 1 with the exception that brass insert 24 and set screw 26 are removed, and a modified internal mounting portion 19 is provided which directly receives the valve stem shaft 20. The handle screw 22 is inserted within the valve stem shaft 20 which is drilled and tapped.

As can be seen from the prior art of FIGS. 1 and 2, a rather complex structure is required in order to attach the faucet handle to the valve stem shaft. In both prior art devices illustrated, the handle must include a recess, an index cap, and at least a handle screw 22. As will be explained further below, the faucet assembly in this invention greatly simplifies the mounting of the handle to the valve stem shaft.

Figure 4:
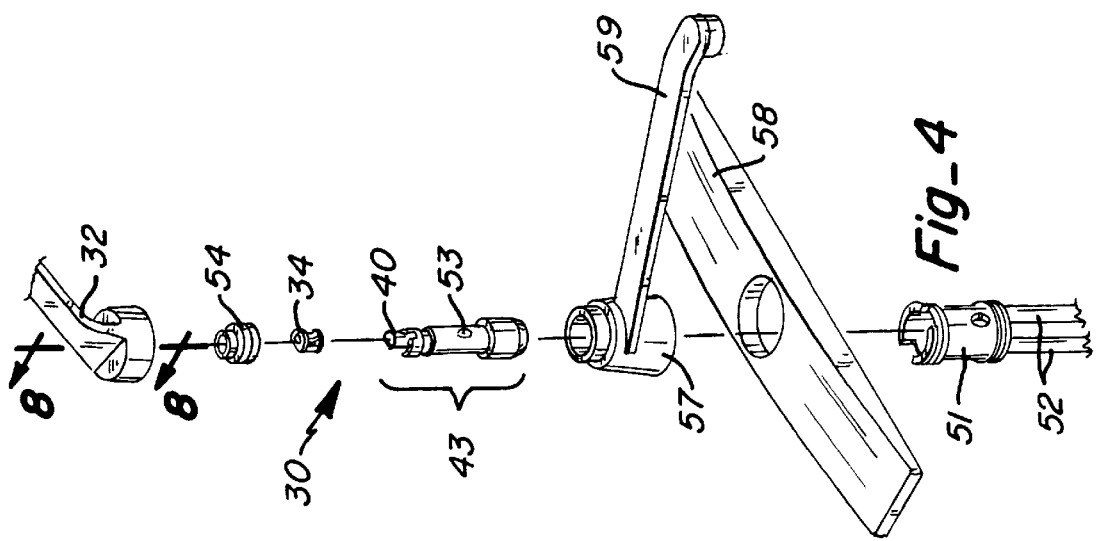
FIG. 4 is another exploded perspective of the faucet assembly of this invention especially adapted for use with a cartridge-type valve assembly.
Figure 3:
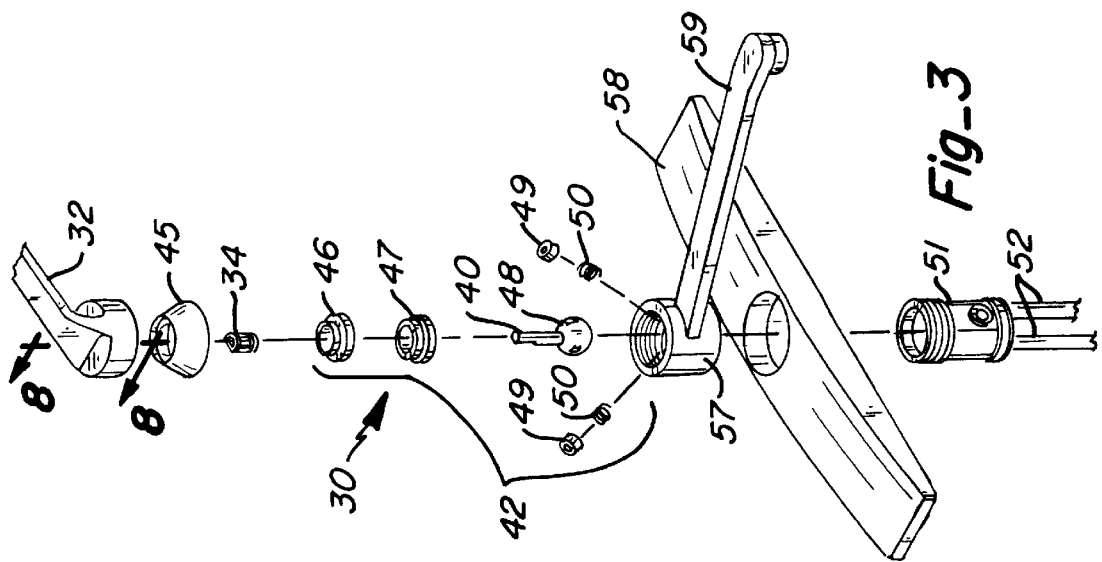
FIG. 3 is an exploded perspective view of the faucet assembly of this invention especially adapted for use with a ball-type valve assembly.

FIG. 3 illustrates the use of D-spring 34 and handle 32 with a standard ball-type valve assembly 42. FIG. 4 illustrates the use of D-spring 34 and handle 32 with a standard cartridge valve assembly 43, and FIG. 5 illustrates the use of flat spring 36 and handle 32' with a standard compression valve assembly 44. It shall be clearly understood that while the preferred embodiments show various types of valve assemblies 42, 43 and 44, the handles 32 and 32', springs 34 and 36 may be used with any type of valve assembly which incorporates the use of a valve stem shaft 40 for manipulating the flow of water through the valve assembly.

The discussion will now briefly explain the components of the valve assemblies illustrated in FIGS. 3, 4 and 5. Beginning with the ball-type valve assembly of FIG. 3, a dome cap 45 is typically used to house the valve assembly 42. The valve assembly 42 includes a cam 46 and cam washer 47 which fit over ball 48. A cylindrical valve shaft 40 protrudes upwardly through cap 45, cam 46 and cam washer 47 to receive D-spring 34 to releasably attach handle 32 thereto, all as described more fully below. A pair of valve seats 49 and springs 50 are mounted to the ball 48. When assembled, the valve assembly 42 resides in collar 57 and faucet body 51. Water supply lines 52 connect to the lower end of faucet body 51 for providing the water to valve assembly 42. An escutcheon 58 is mounted over the faucet body 51 for decorative purposes. Spout 59 communicates with the valve assembly 42 for directing the water to the desired area. An adjusting ring (not shown) may be used to mount the dome cap 45 to the collar 57.

Referring to FIG. 4, the cartridge valve assembly 43 includes a cartridge unit 53 for controlling the flow of water. The valve stem shaft 40 protrudes from the upper end of the cartridge 53. A retaining nut 54 is used to stabilize the handle for movement between the hot and cold water positions, and a retaining nut clip (not shown) seats the cartridge 53 within faucet body 51. As with the D-spring 34 in the embodiment of FIG. 3, the D-spring is also used in the embodiment of FIG. 4 wherein the D-spring fits over valve stem shaft 40 to releasably attach handle 32 as further discussed below.

FIG. 5 illustrates another embodiment wherein the compression valve assembly 44 is used. As shown, the compression valve assembly 44 includes a valve stem 56 and a valve stem shaft 40 which protrudes therefrom. A sealing washer 61 secured by a brass screw 63 is attached to the lower end of the stem 56. A retaining/packing nut 55 is used to secure the valve assembly 44 to the opening 65 formed in the escutcheon 58. The compression valve assembly 44 controls the flow of water by rotational movement of the valve stem shaft as opposed to more vertical and/or lateral (tilting) movements required for the embodiments of FIGS. 3 and 4. Accordingly, the flat spring 36 is used to along with modified handle 32' as further discussed below.

Referring now to FIGS. 6 and 7, the D-spring 34 is more specifically described as having an upper rim 60 and a lower rim 62 interconnected by a cylindrical side wall 64. A flat 66 is formed on one side of the cylindrical side wall 64. As further discussed below, flat 66 on D-spring 34 corresponds with the flat 41 formed on the cylindrical valve stem shaft 40. The side of the D-spring 34 opposite the flat 66 includes an open area split by a pair of resilient members 68 which extend substantially along longitudinal axis A—A and are bent concentrically inwardly as shown. Thus, small gaps are formed between the resilient members 68 and on each opposite side thereof. Cylindrical side wall 64, flat 66 and resilient members 68 define a longitudinal opening for receiving valve stem shaft 40. Resilient members 68 each have opposite ends interconnected to rims 60 and 62, respectively, and an intermediate portion bent inwardly into the longitudinal opening, as best seen in FIGS. 6 and 7. When the D-spring 34 is mounted over the valve stem shaft 40, the flat 66 corresponds with the flat 41 preventing the D-spring from having rotational movement relative to the valve stem shaft 40. The spring action of spring 34 occurs due to the bent shape of resilient compression spring members 68 which induce concentric compression forces $F_1$ as illustrated in FIG. 7. The bent shape of the resilient members 68 result in the resilient members being normally urged concentrically inward. The diameter of rings 60 and 62 are slightly larger than the effective diameter of valve stem shaft 40. When the D-spring 34 is slipped over the valve stem shaft 30, the resilient compression spring members 68 are forced concentrically outward and resist such opposing force from the valve stem shaft by forces $F_1$.

Referring to FIG. 8, handle 32 is more specifically described as having a body 70 and a cavity 72 which is formed within the body 70. Internal mounting portion 76 is integral with body 70 and defines annular extension 74. A central well is formed within internal mounting portion 76 and is defined by inner cylindrical side wall 77, as shown.

The central well may further include an enlarged portion defined by side wall 81 which extends a desired distance into the central well. As best seen in FIG. 9, the interior shape of the enlarged portion defined by side wall 81 is D-shaped corresponding to the shape of D-spring 34 and shaft 40 with flat 41. In other words, the enlarged portion is round in shape except for a flat 78 which corresponds to and is in facing relationship to flat 41 of shaft 40 and flat 66 of D-spring 34. The enlarged portion is sized to receive the D-spring and shaft 40 such that there is a close tolerance fit wherein the external sides of flat 66 and and upper and lower rims 60 and 62 contact the inner surface 81 defining the enlarged portion.

FIGS. 8, 9 and 13 illustrate the installation of handle 32 and D-spring 34 onto valve stem shaft 40. As shown, D-spring 34 is installed within handle 32, positioned to its fullest insertion within the enlarged portion of the central well as defined by side wall 81, the vertical length of which substantially corresponds to the vertical length of the D-spring 34. Next, handle 32 is aligned with the distal end of shaft 40. Finally, shaft 40 is inserted within the central well of handle 32 as defined by side wall 77, positioned for the fullest engagement of shaft 40 within the central well. The depth of the central well defined by side wall 77, and the position of lip 67 on shaft 40 are the principal factors which determine the final engagement depth which can be achieved. It shall be clearly understood that the suggested sequence of assembly stated in this paragraph in no way limits the applicability of this invention, for the components may in fact be assembled in any chosen sequence with equal outcomes resulting.

Once the handle 32 has been placed in this position, the handle has been securely mounted to shaft 40. The upper and lower rims 60 and 62 as well as flat 66 make firm contact with inner surface 81 to create the friction fit. The insertion of the distal tip of shaft 40 into the central well defined by side wall 77 further stabilizes the handle in its mounted position over shaft 40.

Referring now to FIG. 10, the flat spring 36 is characterized by a curved body 80 and a rim/flange 82 located at one thereof. A stop tab 84 is punched out of curved body 80. As shown, the stop tab 84 has been punched in a triangular shape; however, it will be understood that a triangular shape punch is only one shape of many that can be utilized. Edge 85 opposes rim/flange 82 and is curved to form tips 86. The curvature of body 80 primarily provides compression spring force $F_2$ which resists deformation of the spring in a direction opposite the curvature.

Referring to FIG. 11, flat compression spring 36 is used in conjunction with handle 32'. Handle 32' is identical to handle 32, except for the arrangement of elements within the central well defined by side wall 77. In lieu of the enlarged portion defined by side wall 81, the central well of handle 32' includes a lateral side wall 75 which defines a transverse gap or slot 73. Accordingly, spring 36 is inserted into slot 73 with flange 82 making initial entry, and stop tab 84 and tips 86 bearing outward against side wall 75 of slot 73. Stop tab 84 and tips 86 can become embedded in side wall 75, which is made of a softer material to minimize the chance of flat compression spring 36 becoming dislodged once it is in place in slot 73. Handle member 32' is then placed over shaft 40, which inserts to its fullest depth within the central well defined by side wall 77. Curved body 80 makes firm contact against shaft 40 and may flatten or deform slightly to keep the handle member 32' mounted over shaft 40. Additionally, stop tab 84 and end 80 make firm contact against side wall 75 to ensure that the handle member 32' cannot be inadvertently pulled upwards. Depending upon the amount of spring force desired, the size or number of stop tabs 84 can be changed, or the amount of curvature in body 80 can be adjusted. FIG. 14 further illustrates the installation of flat spring 36 within handle 32'.

By the foregoing, the advantages of the faucet assembly of this invention are apparent. Standard valve assemblies may be used in conjunction with modified faucet handles which make use of two types of springs to secure the handles to the valve stem shafts. The great simplification of a faucet handle and the use of the springs provides many advantages as discussed above.

This invention has been described in detail with reference to particular embodiments thereof, but it will be understood that various other modifications can be effected within the spirit and scope of this invention.

What is claimed is:

1. An improved faucet assembly comprising:
   a valve assembly for controlling the flow of a liquid therethrough, and a cylindrical valve stem having a proximal end and a distal end with a first flat therealong, said proximal end received in said valve assembly to selectively control the flow of the liquid in the valve assembly;
   a spout communicating with said valve assembly to receive a discharge of liquid from said valve assembly and to direct said discharge to a desired area;
   a handle removably mounted to said valve stem, said handle further including an internal mounting portion, having a second flat, for receiving said distal end of said cylindrical valve stem so that said first flat thereof is in facing relationship to said second flat; and
   a compression D-spring inserted in said internal mounting portion, said D-spring having longitudinally spaced continuous arcuate rims, a cylindrical side wall interconnecting said longitudinally spaced continuous arcuate rims and extending around a portion of said stem, a third flat in engagement with said first flat, and at least one resilient member interconnecting said longitudinally spaced continuous arcuate rims, said longitudinally spaced continuous arcuate rims, said cylindrical side wall, said third flat and said at least one resilient member all defining a longitudinal opening therethrough, said spring member being mounted to said valve stem by inserting said distal end of said cylindrical valve stem through said longitudinal opening of said spring member wherein said at least one resilient member provides a compression force against said cylindrical valve stem to hold said valve stem within said internal mounting portion.

2. A faucet assembly, as claimed in claim 1, wherein said at least one resilient member includes:
   a plurality of spaced resilient members interconnecting said longitudinally spaced continuous arcuate rims.

3. A method of assembling a faucet assembly comprising in order the steps of:
   providing a valve assembly for controlling the flow of a liquid through the valve assembly, the valve assembly including a cylindrical valve stem having a first flat protruding from the valve assembly;
   placing the valve assembly in alignment with a spout communicating with an outlet of the valve assembly;
   providing a handle having an internal mounting portion formed therein having a second flat, and an enlarged portion within the internal mounting portion;
   positioning a compression D-spring within the enlarged portion of the handle, the compression D-spring having longitudinally spaced continuous arcuate rims, a cylindrical side wall interconnecting said longitudinally spaced continuous arcuate rims, a third flat for engagement with said first flat, and at least one resilient member interconnecting said longitudinally spaced continuous arcuate rims all defining a longitudinal opening therethrough;

mounting the handle over the distal end of the cylindrical valve stem;

moving the valve stem through and beyond the longitudinal opening in the D-spring; and seating the distal end of the cylindrical valve stem in the internal mounting portion within the handle with the first and second flats in facing relationship such that the at least one resilient member provides a compression force against the cylindrical valve stem urging the first and second flats toward each other thereby minimizing longitudinal and rotational movement of the handle with respect to the cylindrical valve stem.

4. A faucet assembly, as claimed in claim 2, wherein:

each of said plurality of spaced resilient members has opposite ends connected to said respective longitudinally spaced continuous arcuate rims and an intermediate portion bent inwardly into said longitudinal opening so as to engage said valve stem and provide said compression force.

* * * * *